United States Patent [19]

Kirner et al.

[11] 4,369,040

[45] Jan. 18, 1983

[54] HIGHLY CONCENTRATED, STORAGE-STABLE AND HEAT-RESISTANT, FLOWABLE AQUEOUS DISPERSION OF ACTIVE INGREDIENTS WHICH ARE SPARINGLY SOLUBLE OR INSOLUBLE IN WATER

[75] Inventors: Hans D. Kirner, Pratteln; Jacques Wegmann, deceased, late of Bettingen, Switzerland, by Ruth Wegmann, Alex Wegman, Yvonnne Wegmann, heirs

[73] Assignee: Rohner AG Pratteln, Pratteln, Switzerland

[21] Appl. No.: 236,516

[22] Filed: Feb. 20, 1981

[30] Foreign Application Priority Data

Feb. 22, 1980 [CH] Switzerland .......................... 1454/80

[51] Int. Cl.$^3$ ...................... C09B 67/04; C09B 67/46; C09B 67/40
[52] U.S. Cl. ........................................... 8/527; 8/553; 106/308 M; 252/301.21; 524/161; 428/537
[58] Field of Search .................. 260/29.6 HN; 8/553, 8/527; 106/308 M, 308 N; 252/301.21; 524/161

[56] References Cited

U.S. PATENT DOCUMENTS

| Re. 21,402 | 3/1940 | Crossley | 8/650 |
| 2,798,788 | 7/1957 | Studer et al. | 8/553 |
| 2,861,863 | 11/1958 | Schuster et al. | 8/553 |
| 2,971,812 | 2/1961 | Moran et al. | 8/553 |
| 3,492,253 | 1/1970 | Katz et al. | 106/308 N |
| 3,707,351 | 12/1972 | Mecco | 8/553 |
| 3,844,806 | 10/1974 | Wegmann et al. | 8/527 |
| 3,900,286 | 8/1975 | Wegmann et al. | 8/527 |
| 3,904,562 | 9/1975 | Hopfenberg et al. | 106/308 M |
| 4,127,422 | 11/1978 | Guzi et al. | 106/308 M |

FOREIGN PATENT DOCUMENTS

| 137923 | 11/1947 | Australia | 260/29.6 |
| 2123270 | 11/1972 | Fed. Rep. of Germany | 252/301.21 |
| 1409145 | 10/1975 | United Kingdom | 260/29.6 |

OTHER PUBLICATIONS

Schwartz et al., Surface Active Agents, vol. I, Interscience Publ., N.Y., 1949, pp. 116–121.

Primary Examiner—Maria Parrish Tungol
Attorney, Agent, or Firm—Finnegan, Henderson, Farabow, Garrett & Dunner

[57] ABSTRACT

The dispersion contains
(a) from 30 to 60% by weight of one or more active ingredients having a mean particle size of less than $5\mu$,
(b) from 0.1 to 5% by weight of one or more water-soluble homopolymers or copolymers of a N-vinyl-lactam,
(c) from 0.1 to 5% by weight of one or more anionic compounds devoid of dispersant character,
(d) from 0 to 30% by weight of one or more humectants and
(e) water.

The active ingredient is sparingly soluble or insoluble in water.

The copolymer may be derived from two or more different N-vinyl-lactams or from one or more N-vinyl-lactams and one or more other compounds copolymerizable therewith.

The anionic compound or compounds is or are chosen from the group comprising water-soluble alkali metal salts or ammonium salts of aromatic monosulfonic acids, disulfonic acids and trisulfonic acids, which acids may be substituted by alkyl groups of at most 8 carbon atoms or by a cycloalkyl group of at most 6 carbon atoms.

The dispersion is prepared by wet milling of corresponding amounts of components (a), (b), (c) and (d) until the mean particle sizse of component (a) is less than $5\mu$.

Depending on the active ingredient present, the dispersion may be used, inter alia, as a finishing agent for plastics, paper or textiles.

7 Claims, No Drawings

HIGHLY CONCENTRATED, STORAGE-STABLE AND HEAT-RESISTANT, FLOWABLE AQUEOUS DISPERSION OF ACTIVE INGREDIENTS WHICH ARE SPARINGLY SOLUBLE OR INSOLUBLE IN WATER

The present invention relates to highly concentrated, storage-stable and heat-resistant, flowable aqueous dispersions of active ingredients which are sparingly soluble or insoluble in water, to a process for the preparation of the dispersions by wet milling, to a process for finishing plastics, paper and textiles, using the dispersions, and to the finished products thus obtained.

Because of their acknowledged advantages, especially their ease of use, highly concentrated aqueous dispersions are of increasing importance as the forms in which numerous active ingredients which are sparingly soluble or insoluble in water are sold. However, such dispersions have to conform to particularly high standards in respect of storage stability, stability to low temperature and to heat, and transportability. Compared to powder formulations they have, in particular, the advantage that the active ingredients are already in a dispersed form and hence, when preparing a formulation, a comparatively low content of dispersants and stabilizers suffices.

Aqueous dispersions of solid or liquid products, especially of synthetic resins, which contain, as protective colloids, copolymers of N-vinyl-lactams with vinyl esters of aliphatic carboxylic acids of up to 4 carbon atoms have been disclosed (British Pat. No. 890,691). Protective colloids which have already been proposed include natural products, such as casein, alginates and cellulose derivatives, and fully synthetic products, such as polyvinyl alcohol and polyvinylpyrrolidone. The use of the last-mentioned polymers as protective colloids for pigment dispersions was claimed for example, in British Pat. No. 835,637. However, large amounts, namely 10 to 100%, based on pigment, were employed.

Dispersions of vat dyes which contain small amounts of poly-N-vinyl-2-pyrrolidone, of the order of magnitude of 0.2 to 3%, as the protective colloid, are described in U.S. Pat. No. 2,971,812. The vat dye concentrations in the formulations are as low as from 6 to 20%. The dispersions remain liquid and their viscosity does not change even after a lengthy period of storage. The above U.S. Patent also points out that conventional anionic dispersants, such as ligninsulfonates or condensation products of naphthalenesulfonic acids with formaldehyde, can optionally be added, which in some cases improves the results further. The combination of poly-N-vinyl-2-pyrrolidone and anionic dispersants of the type of the naphthalenesulfonic acid/formaldehyde condensation products is also explicitly mentioned in French Laid-Open Application No. 76/27,591, alongside numerous other combinations.

Even though, taking account of the requirements which commercial forms have to meet, the optional combination of poly-N-vinyl-2-pyrrolidone and dispersants, such as ligninsulfonate, proposed in the above U.S. Pat. No. 2,971,812, appears best, it is still not fully satisfactory; in particular, though thixotropy at room temperature is eliminated, it manifests itself again at a higher temperature, for example at 40°-60° C. Accordingly, the viscosity of such dispersions rises greatly at elevated temperatures; after cooling, the dispersions must therefore be regenerated (ie. again rendered flowable) by means of high-efficiency stirrers. However, if the dispersions have been packaged in cans, such stirring presents considerable difficulties. Furthermore, anionic dispersants, such as ligninsulfonates and naphthalenesulfonic acid/formaldehyde condensation products, cause difficulties in the application of dyes.

Particularly when formulating a range of the diazotizable aromatic amines extensively required in employing the ice color technique, combination with anionic dispersants reveals a certain incompatibility, in that precipitates form on diazotization. Furthermore, anionic dispersants have an adverse effect in textile printing when thickeners of low body, for example those based on polyacrylic acid, are employed, in that the dispersants reduce the viscosity of the print pastes. When dyeing and printing union textiles of aromatic polyesters and cellulose fibers, combinations of water-soluble reactive dyes and disperse dyes are frequently used; if the formulations contain anionic dispersants, the disperse dyes in such cases significantly interfere with the degree of fixing of the reactive dyes to the cellulose component.

We have found, surprisingly, that the above undesired properties of such dispersions can be overcome without detracting from the desired advantages, if there are added to the aqueous dispersions of active ingredients which are sparingly soluble or insoluble in water, alongside small amounts of polymers or copolymers of N-vinyl-lactams, eg. poly-N-vinyl-2-pyrrolidone, also small amounts of water-soluble, low molecular weight anionic compounds which do not possess dispersant character, accordingly do not foam, and also do not exert any adverse influence on the use characteristics. The effectiveness of this combination is all the more surprising since protective colloids have hitherto, when employed for stabilizing aqueous dispersions, always been used in combination with components which have an unmistakable dispersant character, or been used with no additional components at all. The dispersions according to the invention can be prepared with particularly high concentrations and do not lose their heat stability, ie. their flowability, even at these exceptionally high concentrations of active ingredient.

The dispersion according to the invention is defined in claim 1.

Examples of anionic compounds which do not belong to the class of the dispersants are tetrahydronaphthalenesulfonates and octahydroanthracenesulfonates, as well as benzenesulfonates and naphthalenesulfonates, especially their short-chain alkyl derivatives, such as sodium toluenesulfonate, sodium ethylnaphthalenesulfonate, sodium isopropylnaphthalenesulfonate and sodium isobutylnaphthalenesulfonate. The corresponding salts with amines can also be used. It is true that some of the anionic compounds mentioned have the character of a wetting agent, but none of them is a dispersant. The arylsulfonates should preferably not contain any substituents except for alkyl radicals; in particular, additional groups such as nitro groups and carboxyl groups have a detrimental effect. The anionic compounds must be water-soluble. They are used in small amounts, namely from 0.1 to 5% by weight, preferably from 0.5 to 2% by weight. These small amounts are nevertheless sufficient for optimum effectiveness.

The polymers or copolymers of N-vinyl-lactams used as component (b) are also used in small amounts, namely from 0.1 to 5% by weight, preferably from 0.5 to 2% by weight. Again, these amounts suffice to achieve the full effect. Polymers of N-vinylpyrrolidone having a molecular weight of from 20,000 to 100,000 are particularly suitable. They may or may not be alkylated.

In order to protect the dispersions against drying out and specifically also against the effect of low temperatures, for example −20° C., such as may occur during transportation, compounds which lower the freezing point, and humectants, are preferably added. Amounts of from 10 to 30% by weight, depending on the concentration of active ingredient, as a rule suffice. Many hydrotropic substances which lower the freezing point, such as urea, may at the same time be used as humectants. However, polyols and polyol-ethers are the most suitable. Examples of these are ethylene glycol, propylene glycol, dipropylene glycol, diethylene glycol, ethylene glycol diethyl ether, glycerol, pentaerythritol and sorbitol.

The active ingredients which are sparingly soluble or insoluble in water are present in amounts of from 30 to 60% by weight and have a mean particle size of less than 5 μm, preferably less than 1μ, so that they do not sediment even on prolonged storage. The requisite particle size is advantageously achieved by comminution in a stirred ball mill in the presence of the anionic compound, the N-vinyl-lactam polymer or copolymer and the humectant, if any. The milling bodies used may be of glass, porcelain, ceramic or metal, or they may be natural sand.

Examples of suitable active ingredients which are sparingly soluble or insoluble in water are organic and inorganic pigments, disperse dyes, vat dyes, diazotizable bases, naphthol coupling components and optical brighteners. Other active ingredients which may be present in the dispersions according to the invention are plastics, finishing agents for plastics and textiles, such as antioxidants, light stabilizers and flameproofing agents, drugs, and agrochemicals, such as insecticides and herbicides.

In certain cases, for example in the case of dyes, it can be of advantage to subject the active ingredients to a pretreatment, in order to be able to prepare particularly highly concentrated dispersions. Examples of such pretreatments are a high temperature treatment in an aqueous medium (under pressure if necessary), recrystallization from solvents, or resin coating, ie. pretreatment of a crude dye with an acid resin.

The examples which follow, in which parts and percentages are by weight, illustrate the invention without implying any limitation thereof.

EXAMPLE 1

50 parts of 1-amino-2-phenoxy-4-hydroxyanthraquinone are milled in a solution of 20 parts of 70% strength aqueous d-sorbitol solution and 2 parts of poly-N-vinyl-2-pyrrolidone of mean molecular weight 30,000 in 26 parts of water, in a stirred ball mill in the presence of 100 parts of glass beads of about 2 mm diameter, until there is a marked increase in viscosity. The dispersion is liquefied by adding 2 parts of sodium 1-naphthalenesulfonate.

When the mean particle size of the dye has fallen to less than 2μ, the dispersion is separated from the milling bodies and filtered. A stable formulation is obtained, which is easily pourable, does not sediment and is stable at temperatures of from −20° to +50° C.

If the above disperse dye is replaced by other disperse dyes, as mentioned, for example, in British Patent No. 1,221,126, and in other respects the procedure described above is followed, dispersions of similar good quality are obtained. The dispersions may be used, in the form of aqueous or aqueous-organic printing inks, for printing on synthetic textiles or printing on paper to produce transfers for use in sublimation transfer printing. They may however also be used for dyeing synthetic textiles by conventional exhaustion and impregnation processes.

EXAMPLE 2

50 parts of the azo dye of the formula

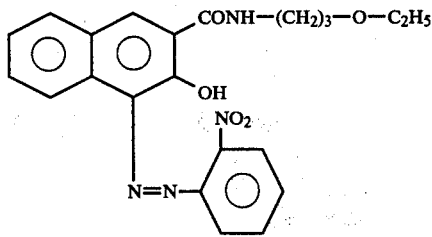

are milled in a solution of 15 parts of sorbitol, 1 part of poly-N-vinyl-2-pyrrolidone of mean molecular weight 40,000 and 1 part of ammonium butylnaphthalenesulfonate in 34 parts of water, in a stirred ball mill in the presence of 300 parts of glass beads of 1 mm diameter, until the particle size of the dye is less than 2μ. After separating off the milling bodies, a stable, pourable paste is obtained, which does not sediment and shows no change in consistency even on prolonged storage at temperatures of up to 60° C.

If, in place of the above dye, other dyes mentioned in German Laid-Open Application DOS No. 2,841,562 are used, and in other respects the procedure described above is followed, formulations of similar good quality are obtained. Instead of sorbitol, the same amounts of urea, monopropylene glycol, dipropylene glycol or diethylene glycol monomethyl ether may be used.

EXAMPLE 3

50 parts of 1-amino-2-methoxy-4-nitrobenzene are milled in a mixture of 35 parts of water, 15 parts of sorbitol and 0.5 part of poly-N-vinyl-2-pyrrolidone in a stirred ball mill, in the presence of 100 parts of glass beads of 1 mm diameter, until the particle size of the amino compound is less than 1 μm. 1 part of isobutylnaphthalenesulfonate is then added to the paste obtained and the milling bodies are separated off. The paste remains fluid and pourable at up to 60° C.

If the poly-N-vinyl-2-pyrrolidone is replaced by polyvinyl alcohol, methylcellulose or a condensation product of 1 mole of cetyl alcohol and 20 moles of ethylene oxide, and in other respects the procedure described is followed, formulations are obtained which on heating to above 40° C. solidify to a gel.

The paste obtained as described above can be diluted with water and acid and can be diazotized very rapidly, and in high yield, by adding nitrite at room temperature, and then be coupled with naphthols.

EXAMPLE 4

40 parts of Permanent Yellow HR are milled in a mixture of 37.5 parts of water, 20 parts of a 70% strength sorbitol solution, 0.5 part of poly-N-vinyl-2-pyrrolidone and 1 part of isopropylnaphthalenesulfonate in a stirred ball mill, using 300 parts of zirconium oxide beads, until the mean particle size of the pigment is less than 1μ. A slightly thixotropic, stable and pourable paste results.

If, instead of Permanent Yellow HR, corresponding amounts of carbon black, dichloroisodibenzanthrone, dichloroindanthrone, 2-pyridylamino-4,6-dianthraquinonylamino-triazine, 2-chloro-4,6-diisopropylamino-triazine or 2,5-di(benzoxazol-2'-yl)-thiophene are used and in other respects the procedure described is followed, stable, pourable dispersions of similar good quality are obtained.

EXAMPLE 5

10 parts of poly-N-vinyl-2-pyrrolidone, 10 parts of sodium xylenesulfonate, 10 parts of formaldehyde and 150 parts of d-sorbitol are dissolved in 400 parts of water. 400 parts of the monoazo dye of the formula

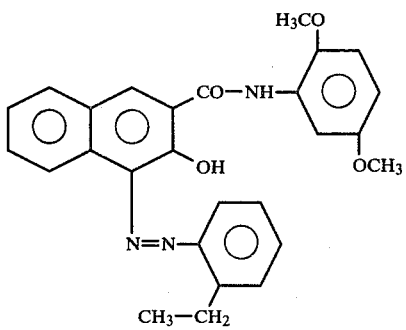

are introduced into this solution. After homogenization, the slurry obtained is milled in a stirred ball mill filled with glass beads of 1-2 mm diameter until the average particle size of the dye is less than 5 μm. After separating off the milling bodies, a storage-stable, easily pourable dispersion, containing 40% by weight of dye, is obtained.

If, in the above example, the sodium xylenesulfonate is replaced by an equal amount of sodium naphthalene-1-sulfonate, an equally good result is obtained.

The dispersions are exceptionally suitable for printing textile structures consisting of aromatic polyesters, even if low-body acrylate thickeners are employed. By low-body thickeners there are meant those in which a pronounced thickening effect is achieved with relatively little thickener.

EXAMPLE 6

10 parts of poly-N-vinyl-2-pyrrolidone, 10 parts of sodium 1-naphthalenesulfonate and 175 parts of d-sorbitol are dissolved in 430 parts of water. 375 parts of 4,4'-dichloro-2-amino-diphenyl ether are introduced into this solution. After homogenization, the slurry obtained is milled in a stirred ball mill, filled with glass beads of 1-2 mm diameter, until the average particle size of the amino compound is less than 5μ. After separating off the milling bodies, a stable, easily pourable dispersion, containing 37% by weight of amino compound, is obtained.

For diazotization, 10 parts of the dispersion obtained above, 60 parts of water at 10°-15° C. and 0.2 part of sodium nitrite are mixed, with stirring. 10 parts of 35% strength hydrochloric acid are then added. The diazotization is complete after brief stirring; a stable diazo solution, free from any residue, is obtained. By comparison, diazotization of a conventional pulverulent commercial product requires more than 60 minutes and because of the slowness of the reaction the addition of ice is necessary.

If, in the above example, 4,4'-dichloro-2-aminodiphenyl ether is replaced by an equal amount of 3,2'-dimethyl-4-amino-1,1'-azobenzene or, after deduction of a corresponding amount of water, by 50 parts of 1-amino-2-methoxy-4-nitrobenzene, dispersions which again have an excellent shelf life and are equally easy to diazotize are obtained.

If, in the above formulations, the sodium 1-naphthalenesulfonate is replaced by equal amounts of a dispersant prepared by condensing 2 moles of sodium 2-naphthalenesulfonate with 1 mole of formaldehyde, diazotization gives unstable diazo solutions, which contain precipitates and are therefore unusable for further conversion.

What is claimed is:

1. A highly concentrated, storage-stable and heat-resistant, flowable, aqueous dispersion of active ingredients which are sparingly soluble or insoluble in water, which contains:
    (a) from 30 to 60% by weight of one or more active ingredients which are sparingly soluble or insoluble in water and have a mean particle size of less than 5μ, said active ingredients being selected from the group consisting of dyes, dye intermediates, pigments and optical brighteners,
    (b) from 0.1 to 5% by weight of a water-soluble poly-N-vinyl-lactam or a water-soluble copolymer of two or more different N-vinyl-lactams or a water-soluble copolymer of one or more N-vinyl-lactams and one or more other compounds copolymerizable with the N-vinyl-lactam,
    (c) from 0.1 to 5% by weight of one or more water-soluble alkali metal salts or ammonium salts of an aromatic monosulfonic acid, disulfonic acid or trisulfonic acid, which acid may be substituted by alkyl groups of up to 8 carbon atoms or by a cycloalkyl group of up to 6 carbon atoms,
    (d) from 0 to 30% by weight of one or more humectants and
    (e) water.

2. A dispersion as claimed in claim 1, wherein the alkali metal salts or ammonium salts are aromatic monosulfonates, disulfonates or trisulfonates which are free from nitro groups and carboxyl groups and contain not more than 4 carbon atoms per alkyl group or 6 carbon atoms per cycloalkyl group.

3. A dispersion as claimed in claim 1, wherein component (b) is poly-N-vinyl-2-pyrrolidone.

4. A dispersion as claimed in claim 1, wherein component (d) is a glycol, a glycol ether or a combination of a glycol and a glycol ether.

5. A dispersion as claimed in claim 1, which contains from 0.5 to 2% by weight of component (b) and from 0.5 to 2% by weight of component (c).

6. A process for the preparation of a dispersion as claimed in claim 1, wherein from 30 to 60% by weight of component (a) is milled wet in the presence of from 0.1 to 5% by weight of component (b), from 0.1 to 5% by weight of component (c) and up to 30% by weight of component (d) (all percentages being based on the finished dispersion), until the mean particle size of component (a) is less than 5μ.

7. A process as claimed in claim 6, wherein the wet milling is continued until the mean particle size of component (a) is less than 1μ.

* * * * *